Dec. 23, 1952  W. VAN B. ROBERTS  2,622,799
MATHEMATICAL MACHINE
Filed Sept. 27, 1950
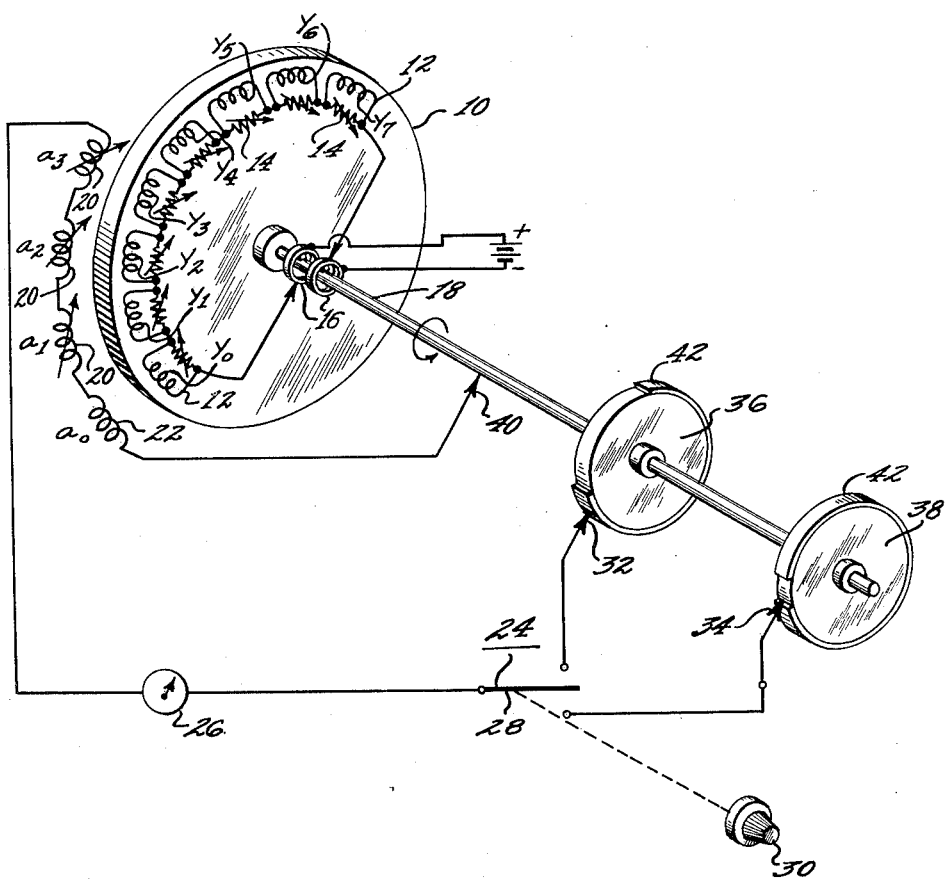
INVENTOR
Walter van B. Roberts
BY
ATTORNEY Patented Dec. 23, 1952

2,622,799

UNITED STATES PATENT OFFICE 2,622,799

MATHEMATICAL MACHINE

Walter van B. Roberts, Princeton, N. J., assignor to Radio Corporation of America, a corporation of Delaware Application September 27, 1950, Serial No. 186,940

6 Claims. (Cl. 235—61)

This invention relates to a mathematical machine for evaluating the unknown constants of an equation.

The method of "least squares" is an old and well-known mathematical tool which is used for approximately fitting a curve to a number of points in excess of two. The method has a basis in the theorems of probability. It requires the assumption that a function of a specified type is a best fitting function for a given set of points if the sum of the squares of the deviations from each of the points to the curve has the least possible value for the given type of function.

The use of the principles of the method of "least squares" in curve fitting usually consists of setting up an equation for a type of curve, which is believed to best fit the known points, and then finding the value of the undetermined constants of an equation of this type which makes the sum of the squares of the errors at the known points a minimum. Of course, once the constants of the equation of the best fitting curve are determined, the value of points along the curve at portions of the curve other than those included by the determining points, may be determined. These determined points may be used as guides or trend indicators or for whatever purposes their probative value indicates. It will be readily appreciated that lengthy and tedious computations are necessary in the application of these principles.

It is therefore an object of this invention to provide a mathematical machine which can rapidly determine the unknown constants of an equation by the principles of the method of least squares.

It is a further object of this invention to provide a mathematical machine which can rapidly compute the value of points along the curve of an equation whose constants are determined by the principles of the method of least squares.

These and further objects of the invention are achieved by providing a mathematical machine having a rotatable disc carrying a number of coils. Each of the coils is at the periphery of the disc and each can be excited to set up a magnetic field proportional to a known value of the function to be represented by the equation. A number of pickup coils are positioned around the disc to be in inducing relationship with the coils on the disc. The pickup coils are spaced to be opposite the disc coils simultaneously. All but one of the pickup coils are adjustable to vary the amplitude and polarity of the voltages induced in them from the disc coils. These induced voltages are caused by rotation of the disc. The pickup coils are all connected in series with the non-adjustable pickup coil being poled in opposition to the others. The output from the pickup coils is applied to a square law meter. While the disc rotates, the adjustable pickup coils are slowly adjusted in turn until the square law voltmeter provides an absolute minimum reading. The positions of the adjustable pickup coils are then proportional to amplitude and sign of the constants of the equation of the curve being fitted and may be calibrated accordingly.

The novel features of the invention as well as the invention itself, both as to its organization and method of operation, will best be understood from the following description when read in connection with the accompanying drawing, wherein a mathematical machine for determining the unknown constant coefficients is shown.

For the purposes of the explanation of the operation of the machine, let $y$ be a function of $t$, or $f(t) = y$.

The values of $y$ at values of $t = t_1, t_2, t_3 \ldots t_n$ are all known, but the value of $y$ at $t = t_0$ is not known. The unknown value, $y_0$, which occurs at $t_0$ can be expressed as $$y_0 = a_1 y_1 + a_2 y_2 + \ldots a_n y_n \qquad (1)$$

provided suitable coefficients $a_1, a_2 \ldots a_n$ can be discovered. It is assumed that the best coefficients are those which produce the least total square of error when applied to determining $y_1, y_2$, etc., from the other known values of $y$. For example, let the expression require the determination of only three coefficients for the sake of simplicity, and let the values $y_1 \ldots y_7$, be known. To find the three unknown coefficients we may write, $$a_1 y_2 + a_2 y_3 + a_3 y_4 = y_1 + \text{Error No. 1} \qquad (2)$$
$$a_1 y_3 + a_2 y_4 + a_3 y_5 = y_2 + \text{Error No. 2} \qquad (3)$$
$$a_1 y_4 + a_2 y_5 + a_3 y_6 = y_3 + \text{Error No. 3} \qquad (4)$$
$$a_1 y_5 + a_2 y_6 + a_3 y_7 = y_4 + \text{Error No. 4} \qquad (5)$$

Since all the values $y_1 \ldots y_7$ are known, the problem resolves itself into determining the set of values for $a_1, a_2$ and $a_3$ which makes the sum of the squares of the four errors a minimum. These values can then be substituted in the equation for $y_0$ and thus its value can be substantially determined.

An embodiment of my invention is shown in the drawing for determining the unknown constant coefficients from an expression giving the value ($y_0$) of a function of one variable ($t$) for a certain value ($t_0$) of that variable in terms of other values ($y_1 \ldots y_n$) of the function at other values ($t_1 \ldots t_0$) of the variable. In the drawing there may be seen a rotatable disc 10 made of a dielectric material which carries, at its periphery, a number of coils 12. This number is one greater than the number of known values ($y_1 \ldots y_n$) of the function defined by Equation 1. Each of the disc coils 12 except one is associated with a different one of the known values ($y_1 \ldots y_n$), and all the coils are connected in series and have resistances 14 shunting them which are variable. The disc coils 12 are excited from a pair of slip rings 16 which are mounted on the same shaft 18 upon which the disc 10 is mounted and which is used to drive the disc.

Each of the disc coils corresponds to one of the $y$'s in Equations 1 through 5 and are so identified on the drawings. The variable resistor 14 for each disc coil (except the one corresponding to $y_0$) are adjusted until the currents in the coils and therefore the intensities of the magnetic fields provided by the coils are proportional to the known values of the function. Of course, if desired, individual excitation may be applied to each of the coils 12 from a plurality of slip rings. A flux meter may be used to measure the magnetic fields or the current in each coil may be measured in well known fashion.

Around the disc and spaced sufficiently close to the disc coils to be cut by the lines of force from the magnetic fields set up by them are a number of pickup coils 20, 22. This number is one more than the number of unknown constant coefficients which are desired. All coils bearing the numeral 20 may be adjusted either by rotation or by other well known means so that the amplitude and polarity of the voltages induced in the pickup coils 20 from the disc coils 12 may be varied as desired. Coil 22, however, need not be adjustable. The pickup coils are all connected in series. The fixed pickup coil 22, however, is poled so that its output opposes that of all the other outputs when all the pickup coils 20 are adjusted to be on the same side of zero and when the same polarity field cuts all the coils. The total voltage output of all the coils is then connected through a cam operated switch to a sluggish square law voltmeter 26, or voltmeter which indicates the average value of the square of the input, when the input repeats itself cyclically with a period small compared to the period of the meter movement.

The pickup coils 20 are spaced around the disc so that each one is simultaneously opposite to a different one of the disc coils. The adjustable pickup coils may have their position adjustments calibrated in terms of the unknown coefficients. These values are plus or minus unity when the coils are in maximum inducing relationship as determined by the polarity of the adjustment. Provision may be made for having this value representative of a given number times unity by increasing the current in all the disc coils by such a given number.

The cam-operated switch 24 actually consists of a two-position switch 28, thrown to either position by a knob 30, each of the positions of which connect to a brush 32, 34. Two metal wheels 36, 38 are mounted on the shaft 18 and make electrical contact with it. The $a_0$ coil 22 is connected to a brush 40 which makes contact with the shaft 18. Both metal wheels 36, 38 have insulation 42 mounted on their peripheries. On one wheel 36 the insulation 42 extends around the periphery so that the one brush 32 will contact the metal wheel only when each of the pickup coils is opposite a disc coil other than the $y_0$ coil. On the other wheel 38 the insulation 42 extends around the periphery so that the other brush 34 contacts the metal wheel 38 only when the $y_0$ disc coil is opposite the $a_0$ pickup coil 22, that is, when the coils are in the position shown in the drawing. The switching system shown is only by way of illustration. Any other switching system which accomplishes the above may be used.

In operation each of the disc coils is excited so that its magnetic field is representative of the value, or, as above indicated, a given number times the values of the associated $y_1 \ldots y_n$. The switch 28 is moved to connect the brush 32 and the disc 10 is rotated by a motor (not shown). Voltages proportional to $y_1, y_2 \ldots y_n$ are induced sequentially in the pickup coils and these are adjusted in turn until the voltmeter reading is a minimum and no further reduction is obtainable. At this time the settings of the pickup coil adjustments are each representative of the coefficients and can be read if desired. It can readily be seen that the machine has performed the operations indicated in Equations 2 through 5, namely, successively substituting different coefficient values in the equations. The sluggish square law voltmeter because of its sluggish reaction serves to add the error voltages and to indicate the sum of their squares. As a more detailed illustration of the machine operation, when $y_7$ is opposite $a_3$, $y_6$ is opposite $a_2$, $y_5$ is opposite $a_1$ and $y_4$ is opposite $a_0$. The respective $y_7$, $y_6$, $y_5$, and $y_4$ voltages are induced into the respective coefficient coils. Coils $a_0$ is unity and is connected to oppose the output of the other coils. Accordingly, the equation $a_1y_5 + a_2y_6 + a_3y_7 = y_4 + $ error is set up. Next the rotation of the disc 10 brings $y_6$ opposite $a_3$, $y_5$ opposite $a_2$, $y_4$ opposite $a_1$ and $y_3$ opposite $a_0$. Thus the equation $a_1y_4 + a_2y_5 + a_3y_6 = y_3 + $ error is set up. The disc 10 continues rotating in this manner setting up each one of the Equations 2 through 5. The coefficient coils are each adjusted in turn as the disc continues rotating until the meter indicates that the sum of the square of the errors is a minimum. The machine has thus determined the best set of unknown constant coefficient values for the equation given using the method of least squares. The machine can be further used to compute the value of a point ($y_0$) on the curve which occurs at a future time ($t_0$) as determined by Equation 1.

The switch 24 is operated to connect to brush 34 so that the switch is closed only for the core positions shown in the drawing, or when the field from the $y_0$ disc coil 12 is cutting the turns of the $a_0$ pickup coil 22. It will readily be recognized that the machine is performing the operations indicated in Equation 1. The variable resistance, shunting the $y_0$ disc coil, is adjusted until the sluggish square law voltmeter reads zero. At this time the magnetic field set up by the $y_0$ disc coil is proportional to $y_0$ and may be read. Alternatively, the current or voltage in the $y_0$ coil may be read or even the voltage across the fixed pickup coil is proportional to $y_0$. All these quantities are proportional to $y_0$.

A possible system for adjusting the field proportional to $y_0$, while the disc is rotating, is to bring leads from the $y_0$ disc coil to an external variable resistor by means of auxiliary slip rings. Preferably, however, the $y_0$ disc coil may be excited by a fixed current and the "fixed" pickup coil 22 may be made adjustable and its adjustment calibrated in terms of $y_0$. Values of the function subsequent to $y_0$ may be predicted by treating $y_0$ as a known quantity after it has been determined as described above.

The speed of rotation of the disc is material only with regard to the sluggishness required for the square law meter. The faster the disc rotates, the less sluggish the meter and vice versa. As many disc coils and as many pickup coils may be used as are required.

From the foregoing description, it will be readily apparent that a mathematical machine has been described by the aid of which the unknown constants of an equation can be readily determined by the principles of the method of least squares, as well as the values of other points along that equation. Other embodiments of the present invention, than the one shown are possible which are within the spirit and scope of the present invention. It is therefore desired that the foregoing description shall be taken as illustrative and not as limiting.

What is claimed is:

1. A machine to determine the best set of constants $a_1, a_2 \ldots a_n$, to use in the equation $y_0 = a_1 y_1 + a_2 y_2 + \ldots a_n y_n$ where $y_0$ is a predicted value of a quantity having known previous values $y_1, y_2 \ldots y_{n+m}$, and the best set of constants is defined as that set which gives the least total squared errors when used to predict the values $y_1 \ldots y_m$ from the known values $y_1 \ldots y_{n+m}$ in the equations:

$$y_1 = a_1 y_2 + a_2 y_3 \ldots a_n y_n + \text{Error}_1$$
$$y_2 = a_1 y_3 + a_2 y_4 \ldots a_n y_n + \text{Error}_2$$
$$y_{n+m} = a_1 y_4 + a_2 y_5 \ldots a_n y_n + \text{Error}_m$$

said machine comprising a plurality of settable first devices each being settable to be representative of a different one of the values $$y_1, y_2 \ldots y_{n+m},$$

a plurality of adjustable second devices each being adjustable to be representative in sign and magnitude of the constants $a_1, a_2 \ldots a_n$, means for producing by the cooperation of any one of said first with any one of said second devices a quantity proportional in magnitude and like in sign to the product of the quantities represented by said first and second devices including means for bringing all of said first devices successively and repetitively into cooperative relationship with all contiguous series of said second devices, means for combining algebraically all the quantities produced within one cycle of said repetitive cooperative relationship, and indicating means, upon which said combined quantities are impressed, having a response period longer than said one cycle and being adapted to respond in proportion to the square of said combination of quantities.

2. A machine to determine the best set of constants $a_1, a_2 \ldots a_n$, to use in the equation $$y_0 = a_1 y_1 + a_2 y_2 + \ldots a_n y_n$$

where $y_0$ is a predicted value of a quantity having known previous values $y_1, y_2 \ldots y_{n+m}$, and the best set of constants is defined as that set which gives the least total squared errors when used to predict the values $y_1 \ldots y_m$ from the known values $y_1 \ldots y_{n+m}$ in the equations:

$$y_1 = a_1 y_2 + a_2 y_3 \ldots a_n y_{n+1}$$
$$y_2 = a_1 y_3 + a_2 y_4 \ldots a_n y_{n+2}$$
$$y_{n+m} = a_1 y_4 + a_2 y_5 \ldots a_n y_{n+m}$$

said machine comprising a plurality of settable first devices, each of said plurality being settable to be representative of a different one of the values $y_0, y_1, y_2 \ldots y_{n+m}$, a plurality of second devices, each of said plurality of second devices but one being adjustable to be representative in sign and magnitude of the constants $a_1, a_2 \ldots a_n$, means for producing by the cooperation of any one of said first devices with any one of said second devices a quantity proportional in magnitude and like in sign to the product of the quantities represented by said first and second devices including means for bringing all of said first devices successively and repetitively into cooperative relationship with all contiguous series of said second devices, switch means having a first position to render the one of said first devices settable to represent the value $y_0$ ineffective when in cooperative relationship with said second devices and having a second position to render said cooperative relationship of said first and second devices effective only when said first devices representative of the values $y_0, y_1, y_2 \ldots y_{n+m}$ are respectively in cooperative relationship with said one second device and said second devices representative of the constants $a_1, a_2 \ldots a_n$, means for combining algebraically all the quantities produced within one cycle of said repetitive cooperative relationship, and indicating means upon which said combined quantities are impressed having a response period longer than said one cycle and being adapted to respond in proportion to the square of said combination of quantities.

3. A mathematical machine for determining the unknown constant coefficients in an expression giving the value of a function of one variable for a certain value of that variable in terms of other values of said variable comprising means to establish a plurality of magnetic fields each of which is proportional to one of said other values of said variable, means to generate successively for a time period pluralities of voltages responsive to certain of said magnetic fields, means to combine all but one of the voltages in each plurality of voltages, means to oppose said combined voltages with said one voltage to produce a resultant, indicating means connected to receive said resultant and operating in accordance with the square of said resultant and to indicate the time average for said time period of the sum of successive resultants, and means to vary all but said one of said voltages in polarity and amplitude until said indicating means indicates a minimum sum of said resultants whereby each of said varied voltages is proportional to the product of said one of said other values of said variable represented by the one of said magnetic fields from which said voltage is generated and one of said unknown constant coefficients.

4. A system for determining the value of the unknown constant coefficients in an expression giving the value of a function of one variable for a certain value of that variable in terms of other values of the function at other values of the variable comprising means to establish a plurality of magnetic fields each one of which is proportional to one of said other values of the function at other values of the variable, a plurality of pickup coils equal in number to one more than the number of said coefficients, all but one of said plurality of pickup coils being connected in series aiding fashion, said one pickup coil being connected to oppose said series aiding pickup coils to provide a resultant output, a sluggish square law indicator connected to receive said resultant output, means to move said plurality of magnetic fields sequentially through each of said pickup coils to induce voltages therein, and means to adjust the positions of all but said one pickup coil until said square law indicator reads a minimum whereby the adjusted position of each of said pickup coils is proportional to one of said constant coefficients.

5. A system for obtaining the value of a function of a variable from other values of the function at other values of the variable comprising means to establish a plurality of magnetic fields all but one of which is proportional to one of said other values of said function at said other variable values, said one field being of unknown value and being adjustable, a plurality of pickup coils, all but one of said plurality of pickup coils being connected in series aiding fashion, said one pickup coil being connected to oppose said series-connected coils to provide a resultant output, a sluggish square-law indicator connected to receive said resultant output, means to move said plurality of magnetic fields sequentially through each of said pickup coils to induce voltage therein, means operable to prevent said one magnetic field from inducing voltages in said pickup coils, means to adjust all but said one pickup coil until said square law indicator reads a minimum, means to render said means to exclude said one magnetic field inoperative to permit said one magnetic field to induce voltages only in said one pickup coil, and means to adjust said one magnetic field until said square law indicator reads substantially zero whereby said one magnetic field has a value proportional to said value of a function of said variable.

6. A mathematical machine for obtaining the value of a function of a variable from other values of the function at other values of the variable comprising a plurality of first coils connected in series, current supply terminals connected to said series connected first coils, means in shunt with each coil to adjust the amount of current flowing through each coil, all but one of said first coils having its current adjusted to be proportional to a different one of said other values of said function, a plurality of second coils, all but one of said second coils being connected in series aiding fashion, said one of said second coils being connected in series opposition, all of said first coils and all of said second coils being spaced and positioned to be in similar and simultaneous inducing relationship, a sluggish square law indicating device, a switch, said indicating device being connected through said switch across said series connected second coils, means to continuously move said first coils past said second coils to induce voltages in each of said second coils responsive to said currents in each of said first coils, means to open said switch when said one of said first coils is in inducing relation with any of said second coils to prevent a voltage being induced in said second coils from said first coil, and means to vary the polarity and amplitude of the coupling with said first coils of all but said one of said second coils until said indicating device indicates a minimum.

WALTER van B. ROBERTS.

REFERENCES CITED

The following references are of record in the file of this patent:

UNITED STATES PATENTS

| Number | Name | Date |
|---|---|---|
| 2,428,800 | Holden | Oct. 14, 1947 |
| 2,525,124 | Galloway | Oct. 10, 1950 |

FOREIGN PATENTS

| Number | Country | Date |
|---|---|---|
| 289,524 | Great Britain | Mar. 20, 1933 |